United States Patent
Egger et al.

(10) Patent No.: US 6,613,137 B2
(45) Date of Patent: Sep. 2, 2003

(54) COATING COMPOSITION, PREFERABLY PRINTING INK FOR SECURITY APPLICATIONS, METHOD FOR PRODUCING A COATING COMPOSITION AND USE OF GLASS CERAMICS

(75) Inventors: Philipp Egger, Lausanne (CH); Edgar Müller, Lausanne (CH)

(73) Assignee: SICPA Holding S.A., Prilly (CH)

( * ) Notice: Subject to any disclaimer, the term of this patent is extended or adjusted under 35 U.S.C. 154(b) by 46 days.

(21) Appl. No.: 10/048,919

(22) PCT Filed: Dec. 2, 2000

(86) PCT No.: PCT/EP00/12134
§ 371 (c)(1),
(2), (4) Date: Feb. 5, 2002

(87) PCT Pub. No.: WO01/51571
PCT Pub. Date: Jul. 19, 2001

(65) Prior Publication Data
US 2002/0124772 A1 Sep. 12, 2002

(30) Foreign Application Priority Data

Jan. 10, 2000 (EP) .............................................. 00810019

(51) Int. Cl.⁷ .......................... C09D 11/00; C09K 11/08
(52) U.S. Cl. .................. 106/31.65; 106/31.9; 106/482; 106/489; 252/301.36; 252/301.4 F; 252/301.6 F; 428/29
(58) Field of Search .............................. 106/31.65, 31.9, 106/482, 489; 252/301.36, 301.4 F, 301.6 F; 428/29

(56) References Cited

U.S. PATENT DOCUMENTS

| 5,116,533 | A | * | 5/1992 | Grandmont et al. ... 252/301.36 |
| 5,686,022 | A | * | 11/1997 | Murayama et al. ... 252/301.4 R |
| 6,168,892 | B1 | * | 1/2001 | Ohara et al. ................... 430/45 |
| 2002/0195586 | A1 | * | 12/2002 | Auslander et al. ..... 252/301.16 |
| 2003/0015123 | A1 | * | 1/2003 | Rozumek et al. ........... 106/415 |

FOREIGN PATENT DOCUMENTS

| GB | 2207440 | 2/1989 |
| GB | 2258659 | 2/1993 |
| GB | 2258660 | 2/1993 |
| WO | WO 96/03466 | 2/1996 |

* cited by examiner

Primary Examiner—Helene Klemanski
(74) Attorney, Agent, or Firm—Shoemaker and Mattare

(57) ABSTRACT

The present invention relates to coating compositions, preferably printing inks for security applications comprising at least one organic resin, at least one pigment and optionally at least one organic solvent. Said pigment comprises glass ceramic composite particles, containing at least one crystalline particle embedded in a glass matrix. Said glass ceramic particles have a particle size in the range of between 0.1 μm to 50 μm. Preferably active ions selected from the group of the rare-earth elements are incorporated into the crystalline phase of the composite to provide the glass ceramics with luminescent up- and down-converting characteristics. Glass ceramic luminescent have excellent physical and chemical stability. The glass matrix permits as well the stabilization of the photophysically interesting halide host crystals which have low phonon energies. Such materials provide unusual excitation and emission properties.

20 Claims, No Drawings

COATING COMPOSITION, PREFERABLY PRINTING INK FOR SECURITY APPLICATIONS, METHOD FOR PRODUCING A COATING COMPOSITION AND USE OF GLASS CERAMICS

The present invention relates to a coating composition, preferably a printing ink for security applications, to a method for producing a coating composition and to the use of glass ceramics according to the preambles of the independent claims.

Pigments which have luminescent properties (phosphors) are well known and are widely used as marking materials in security applications. Luminescent materials can absorb certain types of energy acting upon them and subsequently emit this absorbed energy as electromagnetic radiation. Down-converting luminescent materials absorb electromagnetic radiation at a higher frequency (shorter wavelength) and re-emit it at a lower frequency (longer wavelength). Up-converting luminescent materials absorb electromagnetic radiation at a lower frequency and re-emit part of it at a higher frequency. Luminescent materials are used for coding and marking of mass-produced goods, high value branded articles and security documents. In certain cases an up-converting luminescent is added as a hidden "taggant" to a transparent or colorless coating composition or printing ink, which is applied to branded goods in form of barcodes, company emblems, labels, etc. This allows a subsequent recognition of the genuine article in the fight against counterfeiters and product piracy.

Light emission of luminescent materials arises from excited states in atoms or molecules. The radiative decay of such excited states has a characteristic decay time, which depends on the material and can range from $10^{-9}$ seconds up to various hours. Short-lived luminescent emission is usually called fluorescence, whereas long-lived emission is called phosphorescence. Materials of either type of emission are suitable for the realisation of machine-readable codes. Machine-readability is a necessary prerequisite for mass treatment of goods, e.g. in automated production, sorting, quality control, packaging or authentication operations. Machine-verification is also applied outside production or logistic chains for counterfeit or fraud detection.

The common up-converting materials are of inorganic nature and consist essentially of a crystal lattice in which rare-earth ions are present as activators and sensitizers. The excitation and emission characteristics of up-converting materials are inherent characteristics of the rare earth ions employed. Their corresponding optical absorption and emission processes are due to electron transitions within the incompletely filled 4f shell of the rare earth ion. This electron shell is strongly shielded from the chemical environment of the atom, such that variations in the crystal lattice, thermal vibrations, etc. have only a marginal influence on it. Consequently, rare-earth ions have narrow band optical absorption and emission spectra, which are to a great extent independent of the nature of the crystal lattice. The sharp, discrete bands and the low interaction with the crystal lattice usually result in a high saturation of the luminescence color and a high luminescence quantum yield.

Rare-earth ion luminescence activators have relatively long-lived excited states and a particular electronic structure. This permits the energy of two or more photons in succession to be transmitted to one single luminescence centre and cumulated there. An electron is thus promoted to a higher energy level than that corresponding to the incoming photon energy. When this electron returns from its higher level to the ground state, a photon having about the sum of the energies of the cumulated exciting photons is emitted. In this way it is possible to convert e.g. IR radiation into visible light. Alkali and alkaline earth metal halides, and the halides, oxyhalides and oxysulfides of yttrium, lanthanum and gadolinium are principally used as the host material, whereas e.g. $Er^{3+}$, $Ho^{3+}$ and $Tm^{3+}$ serve as the activators. Additionally, ytterbium(3+) and/or other ions can be present in the crystal lattice as sensitizers to increase the quantum yield.

Down-converting luminescents are either of inorganic or of organic (molecular) nature. Irradiation of the luminescent with short-wave light promotes an electron to a higher excited state. Decay of this higher excited state usually follows a cascade to next-lower excited states, and finally to the ground state, and produces light emissions having longer wavelength than the exciting radiation. Typical down-converting luminescents convert UV to visible light. Conversion of UV or visible light to IR, or of lower wavelength IR to higher wavelength IR is also possible. Usually up-converting luminescents can also be exploited in down-converting modes.

However a lot of up-and down-converting materials are not stable when exposed to oxygen, humidity, and, in particular, to organic solvents and/or media containing chemical oxidising or reducing agents. Thus the choice of luminescent materials, particularly of up-converters which are suitable for being blended as pigments into polymer compositions, such as coating composition or printing inks, is limited to only a few types of host crystals.

GB 2 258 659 and GB 2 258 660 describe up-converting materials based on yttrium oxysulfide ($Y_2O_2S$), doped with erbium and ytterbium. Further disclosed is the use of such materials as pigments in printing inks for security applications.

Since compositions, synthesis and absorption/emission properties of the common up- and down-converting materials fulfilling the necessary stability criteria are more and more known to counterfeiters as well, there is a constant need for new up-and down-converting materials, having uncommon composition and properties, such as particular luminescence decay characteristics, and/or particular luminescence efficiency and/or, in its case, particular branching ratios between multiple emission possibilities, all of them being exploitable for security purposes.

It is an object of the present invention to overcome the drawbacks of the prior art.

Particularly it is an object of the invention to provide new luminescent pigments, especially those having unusual excitation/emission characteristics. It is a further object of the invention to provide up- and down-converting pigments which are resistant to environmental influences, particularly against organic resins and/or solvents.

These objects are solved by the features of the independent claims. Particularly they are solved by a coating composition, preferably a printing ink for security applications, comprising at least one organic resin, at least one pigment and optionally at least one solvent, characterised in that said pigment comprises glass ceramic particles which contain at least one crystalline phase embedded in a glass matrix, said pigment having a particle size in the range of between 0.1 µm to 50 µm.

Preferably the glass ceramic particles have a particle size in range of between 1 µm to 20 µm and even more preferably in the range of between 3 µm to 10 µm.

Glass ceramics are composite solids, which are formed by controlled devitrification of glasses. (See Römpp Chemie Lexikon, ed. J. Felbe, M. Regitz, $9^{th}$ edition 1990, page 156.)

They can be manufactured by heating (tempering) suitable precursor glasses to allow for partial crystallisation of part of the glass composition. Glass ceramics comprise thus a certain amount of a crystalline phase, embedded in a surrounding glass phase.

In a preferred embodiment of the present invention the crystalline phase of the glass ceramics comprise a luminescent material. This is of particular interest and value for luminescent materials, which are not stable in an ordinary environment, and which can in this way be protected from the adverse influence of oxygen, humidity, etc. The glass matrix protects the crystalline phase from dissolution in an adverse environment, and permits incorporation into a coating composition or the like. New types of luminescent materials are thus amenable to printing applications by this method.

Many photophysically interesting luminescent host materials are e.g. water soluble to a certain extent, like the fluorides, chlorides or bromides of the lanthanide elements. The solubility is due to the rather weak electrostatic crystal lattice forces tied to mono-negative anions. The same materials show, due to the same reason and/or to the presence of heavy ions, only low-frequency vibrational modes (phonon modes) of their crystal lattices. The absence of high-frequency vibrational modes results in largely increased excited state life times and luminescence quantum yields. The reason for this is that the probability of vibrational desexcitation of an electronically excited activator ion is low if the energy gap to the next lower lying electronic level is much larger than the energy of the highest vibrational mode (phonon energy) of the crystal lattice. Energy transfer to the crystal lattice becomes negligible in such cases. Host materials with low phonon energy would thus be highly desirable, especially in the field of up-converting phosphors where long-lived excited states are needed for achieving high quantum yields. The water-solubility and moisture sensitivity of lanthanide halides and related materials has up to now prevented corresponding technical applications.

Preferably the crystalline component of the glass ceramics has a phonon energy not exceeding 580 $cm^{-1}$, preferably not exceeding 400 $cm^{-1}$ and even more preferably not exceeding 350 $cm^{-1}$. These values stand for rather low-phonon energy, which are especially suitable as luminescence hosts because they allow for emissions from excited energy levels that would otherwise be quenched in high phonon energy solids, such as oxides or the like.

Phonons, as mentioned, are crystal lattice vibrations in a material. The relevant phonon energy is tied by Planck's relationship $E=h\nu$ to the frequency $\nu$ of the highest measured MIR absorption band of the compound. If an excited rare earth ion has a transition possibility between two energy levels of interest, that corresponds to only a few times the phonon energy of the host lattice, the energy will be preferably and rapidly dissipated to the crystal lattice, without emission of electromagnetic radiation (radiationless transition). In a host lattice with much lower phonon energy, the same transition will preferably radiate. In intermediate cases, both processes, radiating, and radiationless desactivation, will compete with each other.

In the $Pr^{3+}$ ion, the $^1G_4$ level of $Pr^{3+}$ is only 3000 $cm^{-1}$ above the $^3F_4$ level. In an oxide matrix, such as a praseodynium glass, only few Si—O vibration phonons (1100 $cm^{-1}$) are required to bridge this gap. Thus any excited electron in the $^1G_4$ level will rapidly return to the $^3F_4$ level by exciting crystal lattice phonons, and no electromagnetic radiation of the corresponding wavelength is produced. In a $Pr^{3+}$ doped $LaF_3$ matrix, the phonon energy is 350 $cm^{-1}$, and the $^1G_4$ to $^3F_4$ transition of the $Pr^{3+}$ ion occurs radiatively. Additionally, the live time of the $^1G_4$ state is strongly increased.

Since phonon energies are controlled by the bond strengths and the masses of the ions forming the crystal lattice, heavy elements with weak bonding will provide the lowest phonon energy materials. The heavy metal fluoride glasses such as e.g. ZBLAN ($53ZrF_4 \cdot 20BaF_2 \cdot 4LaF_3 \cdot 3AlF_3 \cdot 20NaF$) have half the maximum phonon energy of silicates and thus take twice as many phonons to quench the $^1G_4$ level of $Pr^{3+}$. ZBLAN glasses, a well known host lattice for laser and fibre-optic applications, can also be used as the glass component of glass ceramic composites according to the present invention.

Preferably the glass ceramic is substantially transparent to electromagnetic radiation in the range of between 400 nm to 750 nm, i.e. in the visible range of the electromagnetic spectrum. Transparency of glass ceramics are determinated by the average dimensions of the embedded crystals and/or the refractive index difference between the crystals and the glass matrix.

In a preferred embodiment average dimensions of the crystals are not exceeding 50 nm, preferably not exceeding 40 nm. Exceeding crystal size results in opaqueness of the glass ceramic.

Preferably, the average distance from one embedded crystal to another in the glass matrix should be in the order of the crystal size, e.g. not exceeding 50 nm and preferably not exceeding 40 nm. Apart from transparency another important aspect is the protection of the crystals by the glass matrix. Those host crystals having poor stability towards environmental influences and being neither physically nor chemically resistant towards organic resins, solvents, humidity, etc. can efficiently be protected by a glass matrix having such chemical and physical resistance. If the size of the embedded crystals are according to the preferred embodiment of the present invention, the grinding of the glass ceramics to pigment size particles is surprisingly possible without adversely affecting the luminescent properties of the glass ceramics. The photoactive crystals remain thus protected by the surrounding glass matrix.

In a preferred embodiment at least one crystal in the glass matrix comprises an active ion.

In the context of the present invention the active ion being present in at least one of the crystals in the glass matrix are rare earth ions having an appropriate electronic structure, particularly suitable are rare earth ions selected from the group consisting of $Pr^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$ and $Yb^{3+}$.

In a preferred embodiment of the present invention the glass ceramics is an oxyfluoride glass ceramics. Oxyfluorides have the low phonon energy of a fluoride matrix and the durability and mechanical properties of an oxide glass. The oxide glass will determine the mechanical and physical properties of the composite whereas the optical properties of the active ion will be controlled by the embedded fluoride crystalline phase.

A preferred glass matrix in the present invention for oxyfluorides consists essentially of NAS glass ($Na_2O \cdot Al_2O_3 \cdot SiO_2$) NAS as host glass shows favourable properties with respect to melting and forming, good transparency and excellent durability. The content of $SiO_2$ preferably is between 30 mol % to 90 mol % of the mols of the glass, preferably between 50 mol % and 80 mol %. The higher the $SiO_2$ content in the glasses the more viscous they get and the easier they can be formed into large blocks. However, the fluoride retention is less than in glasses which have a $SiO_2$ content towards the lower limit. The $SiO_2$ can be replaced e.g. by $GeO_2$ and $Al_2O_3$ by $Ga_2O_3$. The alkali content ($Na_2O$) can be replaced fully or partly by other alkalis, mixture of alkalis or alkaline-earths such as BaO. Many other ingredients can be added to the NAS glass in order to modify and tailor the refractive index, expansion, durability, density and color of the glass matrix.

Preferably the crystal phase in the oxyfluorides comprise $LaF_3$. $LaF_3$-glass ceramics can be manufactured by heat treating (tempering) $Al_2O_3$ rich NAS glass saturated with $LaF_3$. The solubility of $LaF_3$ is determined by the $Al_2O_3$ in the glass. $LaF_3$ levels far below the solubility limit results in stable glasses that do not form glass ceramics when heat treated. Therefore the content of $LaF_3$ in the glass has to be within ±15%, preferably 10% of the solubility limit of $LaF_3$. In case the alkali content is replaced by alkaline-earth compositions the solubility of $LaF_3$ is raised. Therefore the amount of $LaF_3$ should be increased. $LaF_3$ glass ceramics shows a chemical resistance which is in many aspects better than glass ceramics used before, e.g. ZBLAN glass ceramics.

The $LaF_3$ crystal phase allows the partition of any rare earth. Therefore a huge variety of up- and down converting materials with very unusual electronic structures can be provided, which are responsive to excitation radiation not commonly used in product security. Thus those glass ceramics in combination with at least a two photon excitation according to the advanced product security system of the present invention broadens the application of up-converters substantially.

In a preferred embodiment the oxyfluoride glass ceramics is transparent and colorless to the human eye.

By controlling the correct microstructure, transparency of oxyfluoride glass ceramics may be achieved which is equivalent to best optical glasses. Generally the microstructure of the $LaF_3$ glass ceramics is a function of the heat treatment temperature. When heat treated at 750° C. for 4 h a large number of relatively small (ca. 7 nm) $LaF_3$ crystals are visible. At higher temperature the crystallites grow larger. At 800° C. the average crystal has a dimension of 20 nm and at 825° C. over 30 nm average crystallite size is observed. Since appropriate crystallite size is the main influence factor for transparency, the glass ceramics formed at 750° C. for 4 h resulted in the most transparent of all. Even with the increase of crystallite size related with the heat treatment up to 775° C. the transparency was still higher than of untreated material. The transparency is measured as a function of the extinction which is the sum of the total loss of scattering and absorption effects. Above 850° C. the oxyfluoride glass ceramics becomes opaque.

The tempered glass ceramic can be ground to pigment. Optimal particle size for most printing applications is in the order of 3 to 10 μm. After incorporating such transparent oxyfluoride glass ceramic particles into a transparent coating or ink vehicle, an invisible product coding can be applied to a substrate. Since the oxyfluoride glass ceramic pigments can be designed with emission properties which do not respond to the excitation radiation of commonly used wavelengths it becomes very difficult for a potential counterfeiter to localise and identify the marking or to retro-engineer the pigment.

The coating composition, preferably printing ink, of the present invention further comprises binders. The binders used in the present invention may be selected from any of the polymers known in the art. Polymers useful in coating composition, preferably printing inks include alkyds, polyurethanes, acrylics, polyvinylalkohols, epoxy-resins, polycarbonates, polyesters, etc. The polymers may be thermoplastic, oxidatively crosslinkable or radiation curable e.g. under UV-radiation. In the latter cases the resins comprise suitable cross-linkable functional groups. Such groups can be hydroxy, isocyanate, amine, epoxy, unsaturated C—C bonds, etc. These groups may be masked or blocked in such a way so that they are unblocked and available for the cross-linking reaction under the desired curing conditions, generally elevated temperatures.

The above-described polymers can be self-crosslinkable or the coating composition can include a separate cross-linking agent that is reactive with the functional groups of the polymer.

The coating composition, preferably printing ink, of the present invention can be solvent- or water-borne. Although the printing ink or coating composition of the present invention may be utilized in the form of substantially solid powder or dispersion a rather liquid state is preferred. The organic solvents can be of the polar or apolar type depending on the binder polymers employed.

Other pigments and or fillers may be present. The term "filler" is defined according to DIN 55943:1993-11 and DIN EN 971-1:1996-09. Filler is a substance in granular or pulvery form which is insoluble in the other components of the coating composition, preferably printing ink and is used to provide and influence certain physical properties of the overall composition.

The term "pigment" is to be understood according to the definition given by DIN 55943:1993-11 and DIN EN 971-1:1996-09. Pigments are colouring materials in pulvery or plate-like dimensions which are—contrary to dyes—not soluble in the surrounding medium. Functional pigments such as magnetic, corrosion inhibiting- and/or electroconductive pigments may be employed as well.

The coating composition, preferably printing ink may comprise other additives, such as rheology control agents, waxes, passive resins, i.e. resins which do not contribute to the film forming process, surfactants, soluble dyes, synergists, photoinitiators, etc.

The coating composition, preferably printing ink, may be applied to the underlying substrate by any of the known deposition processes, such as spraying, brushing, dipping. Preferably it is applied by printing techniques such as flexo-, gravure-, screen, intaglio, letter press and offset printing.

What is claimed is:

1. A coating composition for security applications, said coating composition comprising at least one organic resin and at least one pigment wherein said pigment comprises glass ceramic composite particles which contain at least one crystalline phase embedded in a glass matrix, said pigment having a particle size between 0.1 μm and 50 μm.

2. A coating composition according to claim 1 wherein the pigment has a particle size between 1 μm and 20 μm.

3. A coating composition according to claim 1 wherein the pigment has a particle size between 3 μm and 10 μm.

4. A coating composition according to claim 1 wherein the crystalline phase of the glass ceramic composite particle comprises a luminescent material.

5. A coating composition according to claim 1 wherein the crystalline phase of said glass ceramic composite particle has a phonon energy not exceeding 580 $cm^-$.

6. A coating composition according to claim 1 wherein the crystalline phase of said glass ceramic composite particle has a phonon energy not exceeding 400 $cm^-$.

7. A coating composition according to claim 1 wherein the crystalline phase of said glass ceramic composite particle has a phonon energy not exceeding 350 $cm^-$.

8. A coating composition according to claim 1 wherein the glass ceramic composite particle is transparent to electromagnetic radiation in the range of 400 to 750 nm.

9. A coating composition according to claim 1 wherein the crystalline phase of said glass ceramic composite particle has average dimensions not exceeding 50 nm.

10. A coating composition according to claim 1 wherein the crystalline phase of said glass ceramic composite particle has average dimensions not exceeding 40 nm.

11. A coating composition according to claim 1 wherein said crystalline phase of said glass ceramic composite particle contains at least one active ion for providing long wave to short wave light converting properties.

12. A coating composition according to claim 1 wherein said crystalline phase of said glass ceramic composite contains at least one active ion for providing short wave to long wave light converting properties.

13. A coating composition according to claim 12 wherein said active ion is a rare-earth ion.

14. The coating composition of claim 13 wherein the rare-earth ion is selected from the group consisting of $Pr^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$ and $Yb^{3+}$.

15. A coating composition according to claim 1 wherein the glass ceramic composite particle is an oxyfluoride glass ceramic.

16. A coating composition according to 15 wherein the crystalline component of the glass ceramic composite particle comprises $LaF_3$.

17. A coating composition according to claim 15 wherein the glass matrix consists essentially of $Na_2.OAl_2O_3.SiO_2$.

18. A security document having at least one layer imprinted with a coating composition comprising
   at least one organic resin and
   at least one pigment,
   wherein the pigment comprises glass ceramic composite particles containing at least one crystalline phase embedded in a glass matrix, said pigment having a particle size between 0.1 $\mu$m and 50 $\mu$m.

19. A pigment comprising at least one glass ceramic composite particle material having luminescent properties.

20. A method of producing a coating composition comprising glass ceramic composite particles as pigments, said method comprising steps of
   providing glass ceramic pigment by comminuting said glass ceramic composite material to a predetermined particle size, and
   incorporating said glass ceramic pigment into a coating composition comprising at least one organic resin and at least one pigment.

* * * * *